Oct. 9, 1923.
J. D. SARTAKOFF
1,469,963
WATER FEEDING APPARATUS FOR STORAGE BATTERIES
Filed Dec. 20, 1918
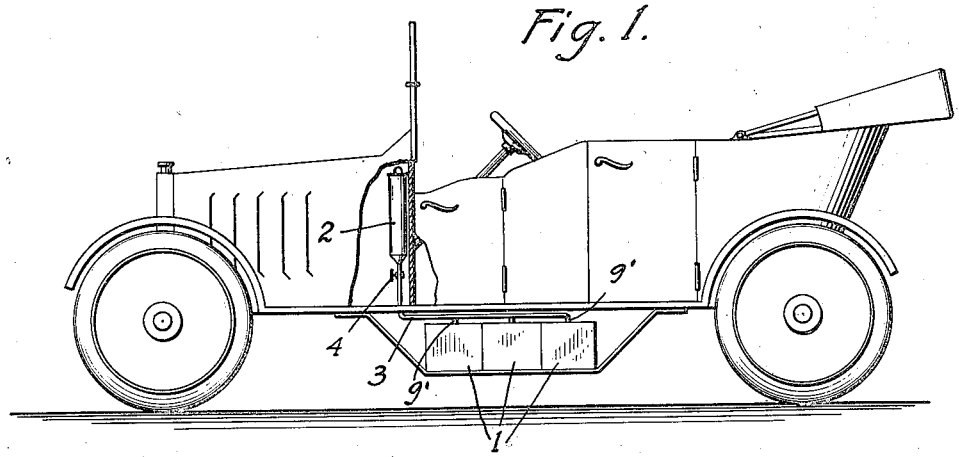
Fig. 1.
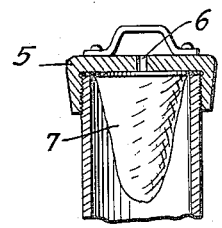
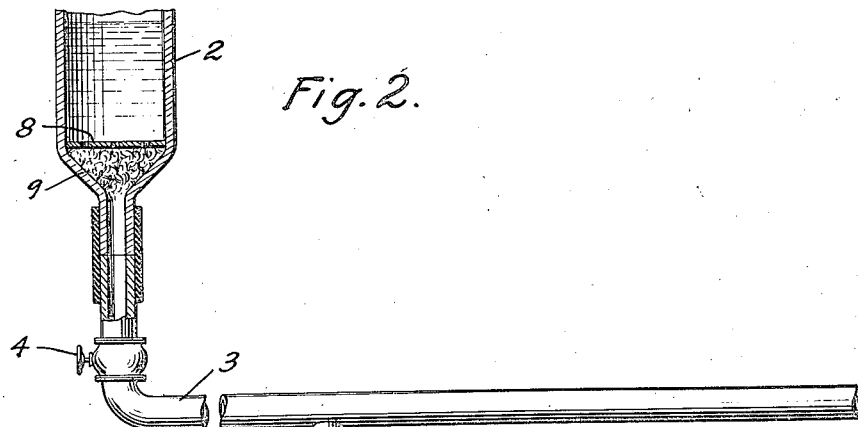
Fig. 2.
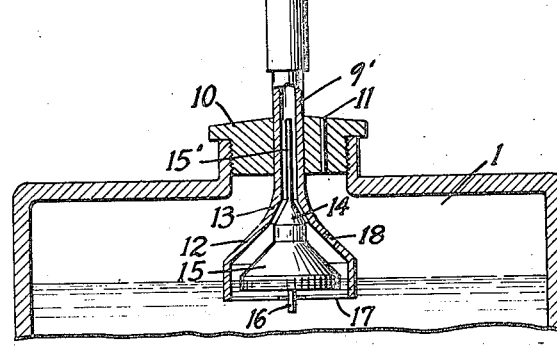
INVENTOR
Jack D. Sartakoff.
BY
Jas. H. Griffin
ATTORNEY Patented Oct. 9, 1923.

1,469,963

UNITED STATES PATENT OFFICE.

JACK D. SARTAKOFF, OF NEW YORK, N. Y.

WATER-FEEDING APPARATUS FOR STORAGE BATTERIES.

Application filed December 20, 1918. Serial No. 267,586.

*To all whom it may concern:*

Be it known that I, JACK D. SARTAKOFF, a citizen of Russia, residing in the city of New York, borough of Manhattan, county and State of New York, have invented a certain new and useful Water-Feeding Apparatus for Storage Batteries, of which the following is a specification.

This invention is a water feeding apparatus for storage batteries, particularly batteries of this type on auto vehicles, and, speaking generally, the main objects of the invention are to increase the efficiency and durability of such batteries, and to avoid the troubles and disadvantages incident to the manner now in practice of supplying them with water. These and numerous other advantages are obtained by employing the apparatus of this invention which supplies the batteries with a uniform, automatic supply of water, and, moreover, with water which has been deprived of the mechanical impurities often introduced with the water, due to the crude methods practiced.

It is recognized by scientific electricians that if the battery fluid is maintained at a substantial strength, volume and concentration that the highest current-producing efficiency is obtained; that all danger of burning the lead plates is precluded, and that recharging is facilitated because the feeding current works substantially against a uniform battery resistance.

Features of the invention other than those adverted to will be apparent from the following detailed description taken in conjunction with the accompanying drawings.

The drawings show the preferred, practical embodiment of the invention, but the form shown is to be considered as typical only of various specific forms in which the invention may be given expression.

Figure 1 is a motor vehicle in perspective showing the storage batteries mounted thereon, and the device of this invention associated therewith, and Figure 2 shows the apparatus of this invention in detail, mainly in section, but partly in elevation.

Referring to the drawings, 1 designates the usual storage batteries, 2 the water supply receptacle of applicant's apparatus, mounted in front of the dash or in some other accessible location, 3 the feed pipe connecting the same with the batteries and 4 a manually controlled cock or valve which may be employed to cut off or control the feed of water through pipe 3.

Water supply tank 2 is preferably made of glass, to permit observation of the volume of liquid therein, in which event it is protected by a suitable casing, not shown, said supply tank being provided with a removable cover 5 to permit of the introduction of the water therein and afford protection against the entry of dirt. Cover 5 may be provided with a small vent 6 to permit access of air to replace the outflowing water. The receptacle 2 is preferably provided at its top with a filtering medium, in the form of a bag 7 suspended from the top edge of the receptacle, which serves to filter out and retain any coarse particles of dirt which might be inadvertently introduced with the water. A perforated plate 8 is preferably positioned near the bottom of the receptacle, beneath which and the outlet of the receptacle may be confined a small mass of glass wool 9, or analogous material, which serves to eliminate the smallest mechanical impurities from the outgoing water.

The horizontal portion of feed pipe 3, in the event several cells are employed as is customary, is provided with branch pipes 9 leading to the different cells 1, said pipes entering the cells through a central aperture in a removable plug 10, provided with a vent 11 to permit of the escape of air or gases as the inflowing water displaces the same.

The lower end of pipe 9 preferably terminates in a bell or dome shaped chamber 12, thereby providing a valve seat 13 with which cooperates a valve 14 formed on the apex of float 15 housed in chamber 12. It is preferable to provide for a vertical travel of the valve and this may be accomplished by a guide stem 15 extending from the top of the valve into branch pipe 9, and, if deemed desirable, by a second stem 16 at the base of the float, the vertical travel of which is secured by extending through a central perforation in a grid 17 extending across the bottom of the bell chamber 12. Bell chamber 12 is provided with a vent 18 to allow exit of air or gases therefrom as water enters the interior of said chamber.

The operation of the apparatus will be perfectly clear from the foregoing description. It will be manifest that it will operate to feed a constant, uniform quantity of pure, filtered water, if necessary drop by drop, to the cells of the battery, thereby obviating the disadvantages, and others, referred to, and resulting in enhanced efficiency, diminished maintenance, and increased durability in the battery.

Batteries, as usually installed, are not readily accessible for supplying water thereto, and when it occurs to one to add the water, a supply of pure water may not be available, and, moreover, the receptacles employed for carrying the water to be supplied, frequently contain oil, dirt, etc., all of which, of course, is detrimental to battery efficiency.

It will be obvious that changes may be made in, or minor parts omitted from, the detailed apparatus, without departing from the spirit or substance of applicant's invention, the scope of which is commensurate with the appended claims.

What I claim as new and desire to secure by Letters Patent is:

1. A liquid feeding apparatus for motor vehicle storage batteries embodying a plurality of conventional battery cells, each of which is provided with a filler cap having a liquid inlet passage leading therethrough, a liquid supply reservoir mounted independently of the cells and at a distance therefrom, a single pipe line leading from the reservoir to a point adjacent the cells and there provided with branch pipes leading to the passages of the several cell caps to supply liquid to said passages at all times, and separate and complete valvular means carried by the filler cap of each cell, and automatically and individually controlled by the electrolyte levels in the respective cells, for automatically and mechanically controlling the flow of liquid through the passages of the respective filler caps into the cells, whereby the electrolyte levels in the several cells are automatically maintained at predetermined heights.

2. A liquid feeding apparatus for the storage batteries of a motor vehicle embodying a plurality of conventional, non-communicating battery cells, each of which is provided with a filler cap having a liquid feed passage leading into the interior of the associated cell, float controlled valvular means carried by each cap for controlling the flow of liquid only, through the passage of the particular cap on which it is mounted, a liquid supply reservoir positioned at a distance from the battery and mounted independently thereof, said reservoir having therein a chamber for supplying liquid to all of the cells, and a conduit leading from the reservoir to the battery and provided with branches communicating with the passages of the several cell caps to supply liquid to said passages at all times, whereby liquid may be fed into any one or more cells to the exclusion of the others for the purpose of maintaining the electrolyte levels of the several cells constant.

3. A liquid feeding apparatus for storage batteries of motor vehicles embodying a plurality of conventional non-communicating cells containing an electrolyte, a filler cap associated with each cell and provided with a liquid inlet passage leading into the interior of the cell, a single supply reservoir positioned at a distance from the battery and mounted independently thereof, and means, including automatic devices carried by the filler cap of each cell and controlled individually by the electrolyte level of each cell, for controlling the flow of liquid from the supply reservoir to the cells individually, whereby their electrolyte levels are separately maintained at predetermined heights.

4. A liquid feeding apparatus for storage batteries of motor vehicles embodying a plurality of conventional, non-communicating battery cells each of which is provided with a filler cap having a passage leading therethrough into the associated cell, a liquid supply reservoir positioned at a distance from the cells and mounted independently thereof, a conduit leading from the reservoir to the passages of the several caps, whereby liquid may be fed from the reservoir through the filler caps into the cells, and means for individually controlling the feed of liquid into each cell.

5. A liquid feeding apparatus for storage batteries of motor vehicles embodying a plurality of filler caps adapted to be applied to a corresponding number of conventional, non-communicating battery cells, a duct passing through each cap, a liquid feed reservoir adapted to be mounted independently of the several filler caps, a pipe leading from the reservoir to the several ducts for supplying liquid to the ducts, and separate float controlled means, carried by each filler cap and adapted to be separately acted upon by the electrolyte levels of the several cells with which the caps are adapted to be associated, for separately controlling the flow of liquid through the duct of each cap, whereby the feeding apparatus may be associated with a conventional battery by applying the several filler caps of the apparatus to the several cells of the battery.

6. An attachment for conventional battery cells embodying a closure cap adapted to be substituted on the conventional cell by merely unscrewing the conventional cap and screwing on the substitute closure cap of the attachment, said substitute closure cap being provided with a passage through which liquid may be introduced into the cell from a point exterior of the cell, means for delivering water to the inlet end of the passage, and means carried by the substitute filler cap and controlled by the electrolyte level in the conventional cell for allowing or precluding the flow of such liquid through the passage into the cell, whereby the attachment may be associated with a conventional cell without requiring any modification of the conventional cell construction.

7. An attachment for conventional battery cells embodying a closure cap adapted to be substituted on the conventional cell by merely unscrewing the conventional cap and screwing on the substitute closure cap of the attachment, said substitute closure cap being provided with a passage through which liquid may be introduced into the cell from a point exterior of the cell, a liquid reservoir adapted to be supported at a distance from the cell and independently of the cell, a conduit leading from the liquid reservoir to the inlet end of the passage through the substitute filler cap and through which conduit liquid can be delivered from the reservoir to said passage, and means carried by the substitute filler cap and controlled by the electrolyte level in the conventional cell for allowing or precluding the flow of such liquid through the passage into the cell, whereby the attachment may be associated with a conventional cell without requiring any modification of the conventional cell construction.

8. An attachment for conventional battery cells embodying a plurality of closure caps equal in number to the number of filler openings of the conventional storage battery with which they are intended for cooperation and which caps are adapted to be substituted on a like number of conventional cells by merely unscrewing the conventional caps and screwing on the substitute closure caps of the attachment, each of said substitute closure caps being provided with a passage through which liquid may be introduced into the cells from a point exterior of the cells, a reservoir adapted to be supported at a distance from the cells and independently thereof, a conduit leading from the reservoir to the passages of the several substitute caps, for feeding liquid to the inlet end of each of said passages, and means carried by each of the substitute filler caps and controlled by the electrolyte level in the corresponding cells individually for allowing or precluding the flow of such liquid through the passages of the caps into the cells, whereby the attachment may be associated with a plurality of conventional cells without requiring any modification of the conventional cell construction.

In testimony whereof, I have signed my name to this specification.

JACK D. SARTAKOFF.